United States Patent
Monpeurt et al.

(10) Patent No.: US 12,547,011 B2
(45) Date of Patent: Feb. 10, 2026

(54) DEVICE FOR PRODUCING A POLYCHROMATIC LIGHT BEAM BY COMBINING A PLURALITY OF INDIVIDUAL LIGHT BEAMS

(71) Applicant: COMMISSARIAT A L'ENERGIE ATOMIQUE ET AUX ENERGIES ALTERNATIVES, Paris (FR)

(72) Inventors: Cyrielle Monpeurt, Grenoble (FR); Mathieu Dupoy, Grenoble (FR); Gabriel Jobert, Grenoble (FR); Olivier Lartigue, Grenoble (FR); Grégoire Mathieu, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 302 days.

(21) Appl. No.: 18/556,568

(22) PCT Filed: Apr. 14, 2022

(86) PCT No.: PCT/EP2022/060102
§ 371 (c)(1),
(2) Date: Oct. 20, 2023

(87) PCT Pub. No.: WO2022/223459
PCT Pub. Date: Oct. 27, 2022

(65) Prior Publication Data
US 2024/0184126 A1    Jun. 6, 2024

(30) Foreign Application Priority Data

Apr. 22, 2021 (FR) .................. 2104212

(51) Int. Cl.
G02B 27/10   (2006.01)
G02B 5/09    (2006.01)
G02B 5/18    (2006.01)

(52) U.S. Cl.
CPC .......... G02B 27/1006 (2013.01); G02B 5/09 (2013.01); G02B 5/1861 (2013.01)

(58) Field of Classification Search
CPC ..... G02B 27/1006; G02B 5/09; G02B 5/1861
(Continued)

(56) References Cited

U.S. PATENT DOCUMENTS 9,620,933 B1    4/2017 Huang et al.
2010/0277698 A1 11/2010 Harland et al.
(Continued)

OTHER PUBLICATIONS

International Search Report as issued in International Patent Application No. PCT/EP2022/060102, dated Aug. 10, 2022.
(Continued)

*Primary Examiner* — William Choi
(74) *Attorney, Agent, or Firm* — Pillsbury Winthrop Shaw Pittman LLP

(57) ABSTRACT

A device includes several distinct laser sources each emitting an individual laser beam, a dispersive element, and a set of deflecting mirrors which, for each laser source, include a deflecting mirror associated to the source, the mirror reflecting the light beam emitted by the source towards the dispersive element, the mirror being positioned and oriented such that, after deflection by the dispersive element, the light beam is substantially centered on a common propagation axis, which is the same for the different light beams, the mirrors being integral with each other.

15 Claims, 5 Drawing Sheets

(58) Field of Classification Search
USPC .......................................................... 359/618
See application file for complete search history.

(56) References Cited

U.S. PATENT DOCUMENTS

2013/0292571 A1    11/2013   Mukherjee et al.
2018/0274976 A1    9/2018    Leavesley et al.

OTHER PUBLICATIONS

Ambrico, P. F., et al., "Sensitivity analysis of differential absorption lidar measurements in the mid-infrared region", Applied Optics, [Online] vol. 39, No. 36, Dec. 2000, XP055947576, pp. 6847-3640, Retrieved from the Internet: URL:https://opg.optica.org/DirectPDFAccess/D8256249-13CF-4C50-90C77B176FCAB71A_62910/ao-39-36-6847.pdf?da=l&id=62910&seq=0&mobile=no>, [Retrieved on Jul. 29, 2022].

DEVICE FOR PRODUCING A POLYCHROMATIC LIGHT BEAM BY COMBINING A PLURALITY OF INDIVIDUAL LIGHT BEAMS

CROSS-REFERENCE TO RELATED APPLICATIONS

This application is the U.S. National Stage of PCT/EP2022/060102, filed Apr. 14, 2022, which in turn claims priority to French patent application number 2104212 filed Apr. 22, 2021. The content of these applications are incorporated herein by reference in their entireties.

TECHNICAL FIELD

The present invention especially relates to a device for combining or, stated differently, for superimposing several light beams with one another, these light beams having different respective mean wavelengths.

TECHNOLOGICAL BACKGROUND

Superimposing light beams emitted by different laser sources makes it possible to obtain a single polychromatic light beam, the spectrum of which comprises several intense peaks centered on different wavelengths. This form of multiplexing (frequency multiplexing) has many applications. For example, it can be used to read out a multispectral image representative, for the different wavelengths in question, of a transmission or reflection of an element to be imaged. When these wavelengths are mid-infrared wavelengths, corresponding to absorption wavelengths of one molecule or another, such a polychromatic light beam makes it possible to detect the presence of different types of molecules, or even to measure the concentration of the molecules in question.

Two light beams emitted by two different laser sources can be combined with each other on a semi-reflective plate to obtain a same overall light beam. But this is accompanied with a significant loss of power (typically by a factor of about two), unless a "dichroic" semi-reflective plate is used, with a reflectivity that depends strongly on a wavelength, being reflective for the mean wavelength of the first beam and transparent for that of the second beam. However, such a dichroic plate can be difficult to make in the mid-infrared range, in particular when the two wavelengths to be reflected or transmitted, respectively, are close to each other, as the filter then needs to have a clear cut-off. Furthermore, a system comprising several semi-reflective plates of this type would be expensive.

Additionally from document US 2013/0292571 a device is known comprising several laser sources emitting in the mid-infrared, which emit individual light beams that are reflected in the same common direction by virtue of a pivoting mirror system mounted to a galvanometric actuator. For each laser source, the beam emitted by the source is first reflected towards the pivoting mirror by virtue of a deflecting mirror. These deflecting mirrors are static, but each one is mounted to a mount with two degrees of freedom, which allows the light beam to be suitably oriented so that it reaches the pivoting mirror. Rotation of the pivoting mirror then allows one and then the other of these light beams to be directed alternately along a given axis, set by two fixed small-diameter diaphragms. But this system has different drawbacks. Firstly, it does not allow these different light beams to be superimposed simultaneously. Secondly, a pivoting mirror system makes the device less reliable and less robust against misalignment over the long term. And the set of mirrors employed to direct the light beams towards the pivoting mirror is of large overall size and tends to go out of adjustment over time.

Document US 2013/0292571 also indicates that the different light beams emitted by these laser sources could, alternatively, be superimposed with one another by virtue of a dispersive element such as a diffraction grating.

From document U.S. Pat. No. 9,620,933 is additionally known a device for combining light beams using a diffraction grating, this device, represented in FIG. 4 of document U.S. Pat. No. 9,620,933, being made from a single-piece block that is transparent to the beams to be combined.

SUMMARY

Within this context, a device is provided for producing a polychromatic light beam, by combining a plurality of individual light beams, the device comprising:
  several distinct laser sources each emitting an individual light beam, said laser sources having respective mean emission wavelengths which are different from each other, and
  a beam combining system comprising:
    a dispersive element which deflects each of said beams differently, as a function of the mean emission wavelength corresponding to that beam, and
    a set of deflecting mirrors which, for each laser source, comprises a deflecting mirror associated with this source, this deflecting mirror reflecting the light beam emitted by this source towards the dispersing element, this deflecting mirror being positioned and oriented so that, after deflection by the dispersing element, said light beam is substantially centered on a common axis of propagation, which is the same for the different light beams,
    the device comprising a monolithic part which has at least as many facets as there are laser sources and wherein, for each of said deflecting mirrors, the reflecting surface of the deflecting mirror is formed by one of said facets, or by a reflecting deposit covering said facet, or by a front face of an individual optical component the rear face of which is attached against said facet,
    each mean emission wavelength being between 2 microns and 15 microns,
    at least two of said mean emission wavelengths being separated from each other by less than 0.3 micron or even less than 0.15 micron, and
    at least two of said mean emission wavelengths being separated from each other by more than 0.5 micron or even more than 1.5 micron.

The different individual light beams reach the dispersive element (for example a diffraction grating) at different respective angles of incidence. The dispersive element then combines these different beams to produce the polychromatic light beam in question, which constitutes an overall light beam, output by the device. This overall light beam is polychromatic in that its spectrum has several intense peaks centered on different wavelengths, in this case on the mean emission wavelengths of the different laser sources. The term "polychromatic" should not be interpreted as limiting the invention to the visible wavelength range.

After deflection by the dispersive element, each individual light beam is substantially centered on said common axis of propagation, in that after deflection by the dispersive element, the mean axis of propagation of the individual light beam considered is parallel to said common axis of propagation to within better than 3 or 4 degrees, or even less. The accuracy with which this superimposition is achieved may, for example, be such that, at a typical working distance from the dispersive element, for example between 0.1 m and 1 m, the beams are superimposed with one another with an accuracy of better than 10% of the diameter of each of these beams.

If the deflecting mirrors are individual optical components, for each mirror the rear face of the mirror is permanently attached, for example bonded, against one of said facets, the mirror thus being integral with the monolithic part.

In any case, the deflecting mirrors are integral with each other. This makes the device dramatically more stable and compact than a device that would be based on adjustable mirror mounts, reduces its mechanical complexity and improves its reliability. This configuration, based on the monolithic part in question, also makes it possible to arrange the deflecting mirrors, or at least some of them, in proximity to each other, or even in contact with each other, which is particularly useful when the emission wavelengths of some of the sources are close to each other. In this case, light beams emitted by these sources will also be close to each other from an angular point of view, just upstream of the dispersive element, that is just before combination.

The deflecting mirrors are distinct from each other. In other words, these mirrors, which are for example planar,
- are oriented differently from one another, and/or
- are (longitudinally or laterally) offset from one another, the mirrors then being disjoint.

As indicated above, in this device for producing a polychromatic light beam, each emission wavelength is between 2 microns and 15 microns, or even between 5 and 11 microns (these values correspond to wavelengths in vacuum). The light beams in question therefore have spectra in the mid-infrared. This range of wavelengths is well adapted to the detection of different types of molecules, whether small molecules such as the carbon dioxide molecule $CO_2$, or larger molecules such as proteins or other molecules of biological interest. However, making such a device, configured for the mid-infrared, has particular technical restrictions compared with a device configured for the visible or near infrared range. For example, for the visible range, high-performance interference filters (dichroic or especially band-stop filters, having a transfer function with very steep edges, enabling close wavelengths to be combined) are commercially available, whereas this is not the case for the mid-infrared range.

Furthermore, the mean emission wavelengths of the different sources are such that:
- at least two of said emission wavelengths are separated from each other by less than 0.5 micron, and even less than 0.3 micron, or even less than 0.15 micron, while
- at least two of said emission wavelengths are separated from each other by more than 0.5 micron, or even more than 1.5 micron (or even more than 3 microns).

The respective wavelengths of the light beams to be combined are then distributed over a fairly wide range of wavelengths, while including wavelengths to be combined that are close together.

The device can also comprise several pairs of sources, each gathering two of said laser sources, the two mean emission wavelengths of the two sources of each pair being separated from each other by less than 0.3 micron, or even less than 0.15 micron.

The polychromatic light beam produced by the device therefore comprises several pairs of close wavelengths. This configuration is particularly interesting in terms of imaging, spectroscopy or detection of molecules and other compounds. Indeed, for each pair of wavelengths, the first of these wavelengths can be chosen to be spaced apart from an absorption peak of the compound to be detected, while the second of these wavelengths coincides with this peak. The first wavelength then serves to measure the absorption of the off-peak sample, to produce a "blank" (i.e. to measure an absorption level of the medium which would correspond to an absence of the substance to be detected), while the second wavelength serves for the detection or measurement of the concentration itself. More generally, such a pair of close wavelengths enables differential detection or differential concentration measurement of the compound in question. On the other hand, combining such wavelengths is particularly restrictive from a geometric point of view. Indeed, before the dispersive element, some beams will be very close to each other from an angular point of view (those associated with a pair of close wavelengths), while others will be very far apart from each other from an angular point of view.

Providing the device with a set of additional mirrors, to be disposed between the sources and the deflecting mirrors, therefore proves to be particularly useful. Indeed, this provides additional freedom for adapting positions and orientations of the light beams emerging from the laser sources to positions and orientations of the deflecting mirrors, which are at least partly imposed by restrictions associated with recombination by the dispersive element (restrictions that may lead to some of these deflecting mirrors being placed very close to one another, or even in contact with one another).

The set of additional mirrors then comprises, for each laser source, an additional mirror associated with this source, this additional mirror reflecting the light beam emitted by this source towards the deflecting mirror associated with the source considered, this deflecting mirror then reflecting this beam towards the dispersive element. The additional mirrors in question may be integral with one another, and may also be integral with the first mirrors.

The set of additional mirrors thus makes it possible to obtain a beam combining system that is both compact and compatible with a large initial inter-beam spacing.

As with the deflecting mirrors, the additional mirrors are distinct from each other. These mirrors, which are for example planar,
- are oriented differently from one another, and/or
- are (longitudinally or laterally) offset from one another, the mirrors being then disjoint.

This configuration with two sets of mirrors is especially interesting when the laser sources are each mounted in a casing specific to the source considered, and are each provided with optics for collimating the emitted beam. Indeed, in this case, the light beams delivered by the laser sources are laterally offset from one another by a fairly large amount, even by adjoining the different casings of these laser sources each other (see FIG. 3 for example).

This configuration with two sets of mirrors is also interesting if the laser sources are small semiconductor laser sources very close to each other (for example, 1 or a few mm apart). Indeed, collimation of the light beams produced is still desirable. If this collimation is carried out with several individual collimators, one per beam, the laser sources will have to be spaced apart from each other, so that the beams produced will again be laterally offset from each other. And if the collimation of the beams is carried out with a same collimator, common to the different beams (see FIG. 8 for example), the axes of propagation of these beams after the collimator will be very far apart from each other from an angular point of view. Under this situation, the set of additional mirrors again proves particularly useful, since here too it brings the light beams closer together so that they reach the deflecting mirrors, and since it also reduces the inter-beam angular deviation introduced by the common collimator.

Immediately upstream of said dispersive element, the individual light beams are respectively centered on different axes called pre-combination axes of propagation. In this device, at least two of said pre-combination axes of propagation can be angularly separated from each other by less than 5 degrees, or even less than 2 degrees. This corresponds to a situation in which the mean emission wavelengths, corresponding to these two light beams to be combined, are close to each other.

The fact that these two pre-combination axes of propagation are very close to each other from an angular point of view poses problems in terms of overall size and optical configuration. Indeed, because of this small angular spacing, the two deflecting mirrors, which reflect these two light beams towards the dispersing element, have to be positioned:
  either far from the dispersive element (to obtain sufficient lateral spacing between the two mirrors), but this makes the device of very large overall size,
  or relatively close to the dispersive element, but then almost against each other, in terms of lateral positions.

Thus, to obtain a compact device, these two deflecting mirrors should be of small size and located in proximity to each other, in terms of lateral positions. It can also be envisaged that the two deflecting mirrors, which reflect the two light beams whose pre-combination axes of propagation are separated angularly by less than 5 degrees or even less than 2 degrees, each have a transverse dimension of between 0.8 times and 3 times the diameter of the beam considered.

In addition to the characteristics mentioned above, the device just described may have one or more of the following additional characteristics, considered individually or according to any technically contemplatable combinations:
  said monolithic part further has additional facets and, for each additional mirror, the reflecting surface of the additional mirror is formed by one of said additional facets, or by a reflecting deposit covering said additional facet, or by a front face of an individual optical component the rear face of which is attached against said additional facet;
  the device comprises an additional monolithic part which has at least as many facets as there are additional mirrors, and wherein, for each additional mirror, the reflecting surface of the additional mirror is formed by one of the facets of the additional monolithic part, or by a reflective deposit covering this facet, or by a front face of an individual optical component the rear face of which is attached against said facet;
  said dispersive element is a diffraction grating made on a face of said monolithic part, or permanently attached against said face;
  said monolithic part is made of a thermally conductive material and the laser sources are in thermal contact with said monolithic part;
  said dispersive element is a reflection diffraction grating and the device comprises a passageway which is provided between two of said deflecting mirrors, said common axis of propagation passing through said passageway;
  said monolithic part is made of a material that is essentially transparent to said light beams;
  the device comprises a collimation element common to the different individual light beams, said collimation element modifying divergence specific to each of said light beams;
  said collimation element comprises an entrance face of said monolithic part that is essentially transparent to said light beams, said entrance face being convex.

The invention and its different applications will be better understood upon reading the following description and upon examining the accompanying figures.

BRIEF DESCRIPTION OF THE FIGURES

The figures are set forth by way of indicating an in no way limiting purposes.

DETAILED DESCRIPTION

Figure 1:
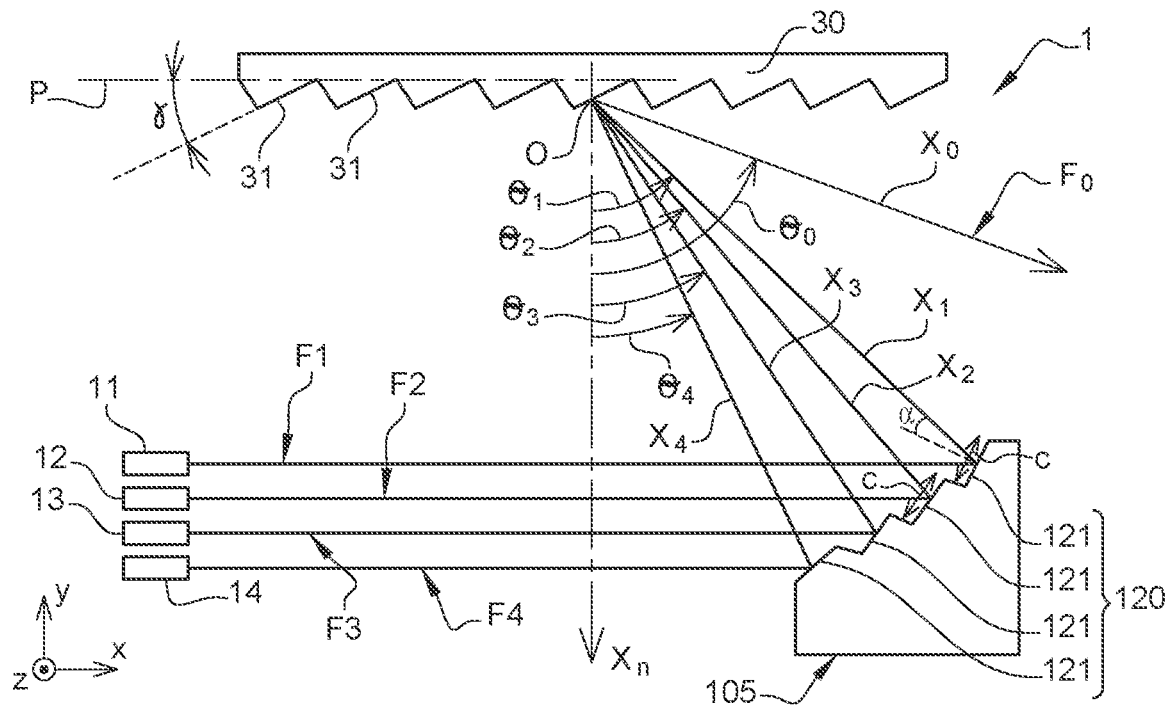
FIG. 1 schematically represents a device for producing a polychromatic light beam according to a first embodiment implementing the teachings of the invention, in a top view.

As indicated above, the invention relates to a device for producing a polychromatic light beam by combining a plurality of individual light beams emitted by different laser sources having respective mean emission wavelengths different from one another. This combination is achieved by virtue of a dispersive element, such as a prism or a diffraction grating.

A first, second, third, fourth and fifth embodiments of this device are represented in FIGS. 1, 3, 7, 8 and 9 respectively. They are denoted in these figures by reference numbers 1, 2, 3, 4 and 5 respectively.

In the second, third, fourth and fifth embodiments, the device 2; 3; 4; 5 comprises a first and a second set of mirrors, which make it possible to adjust with great flexibility the directions and positions of the light beams F1, F2, F3, F4 produced by the different laser sources 11, 12, 13, 14, before combining them by means of the dispersive element 30.

In contrast, in the first embodiment, the device 1 comprises a single set of deflecting mirrors, 120.

Despite their differences, these five embodiments have many points in common, and the identical or corresponding elements of the device from one embodiment to the next will, as far as possible, be denoted by the same reference numbers and will not necessarily be described each time.

As represented in the figures, the device 1; 2; 3; 4; 5 comprises four laser sources 11, 12, 13 and 14. These laser sources 11, 12, 13 and 14 are QCLs (Quantum Cascade Laser). More generally, each source 11, 12, 13, 14 is here a semiconductor laser source, of the laser diode type, comprising one (not several) emissive structure and emitting one (not several) light beam. In particular, the source 11, 12, 13, 14 in question is not in the form of a laser diode array (or laser diode bar or laser diode stack). These laser sources 11, 12, 13, 14 have mean emission wavelengths, $\lambda 1$, $\lambda 2$, $\lambda 3$ and $\lambda 4$, which are different from one another and which, in this case, are located in the mid-infrared range. These mean emission wavelengths $\lambda 1$, $\lambda 2$, $\lambda 3$ and $\lambda 4$ are each between 2 and 15 microns, and even between 5 and 11 microns here. It will also be noted that the fact that beams F1 to F4 are referred to as "light beams" should not be interpreted as meaning that these beams are visible beams. The sources 11, 12, 13 and 14 are distinct from each other. In particular, their respective emissive zones are not formed in a same layer of semiconductor material (which would be common to the different sources), and the set of these different sources does not form a same laser diode array, but instead forms a group of several distinct, and even disjoint, sources.

For each source 11, 12, 13, 14, the mean emission wavelength $\lambda 1$, $\lambda 2$, $\lambda 3$, $\lambda 4$ of the source (hereinafter referred to simply as the emission wavelength) is a wavelength on which the emission spectrum of this source is centered. It may be the mean wavelength of this spectrum, or a wavelength marking the maximum of a main emission peak of the source. Here, the sources 11, 12, 13, 14 are substantially monochromatic, in that they each have a narrow spectrum, with, for example, a spectral width (expressed as a wave number) of less than 0.1 cm$^{-1}$.

These different laser sources 11, 12, 13 and 14 each emit an individual light beam F1, F2, F3 and F4. Just upstream of the dispersive element 30, these light beams F1, F2, F3 and F4 are centered respectively on different pre-combination axes of propagation, noted X1, X2, X3 and X4 (see FIGS. 1 to 6). These axes are angularly offset from one another.

By "centered on the corresponding pre-combination axis of propagation, X1, X2, X3 or X4", it is intended that the mean direction of propagation of each of the light beams F1, F2, F3 or F4 and their respective mean lateral position (in a plane perpendicular to this direction of propagation), are those of the axis X1, X2, X3 or X4 in question.

After deflection by the dispersive element 30, each of these light beams, F1, F2, F3 and F4, is substantially centered (and even, here, exactly centered) on a common axis of propagation Xo, which is the same for the different beams F1, F2, F3, F4. In other words, after deflection by the dispersive element 30, these different beams are superimposed with each other. They thus form an overall polychromatic light beam Fo.

Thus, if the polychromatic light beam Fo were to propagate in the opposite direction, it would be broken down by the dispersive element 30 to produce light beams respectively centered on axes X1, X2, X3 and X4 and propagating in the opposite direction to the beams F1, F2, F3 and F4 (and having respectively mean wavelengths $\lambda 1$, $\lambda 2$, $\lambda 3$ and $\lambda 4$).

In the five embodiments represented in the figures, the dispersive element is a planar reflective grating 30.

The angles of incidence on the grating are respectively $\theta 1$, $\theta 2$, $\theta 3$ and $\theta 4$ for the different light beams F1 to F4 ($\theta 1$, for example, is the angle between the axis X1 and the direction Xn, which is perpendicular to the plane P of the grating). The angle between the common axis of propagation Xo and the direction Xn, known as the exit angle, is noted $\theta o$.

Here, the pre-combination axes of propagation X1, X2, X3, X4 are chosen to correspond to a same given diffraction order, m, for example m=−1. Thus, if the polychromatic light beam Fo were propagating in the opposite direction, the axis corresponding to the diffraction order m, for the wavelength $\lambda 1$, would be X1. The direction of the axes X1, X2, X3, X4 is therefore given by the relationship sin $\theta i$+sin $\theta o$=−m.$\lambda i$/a where i=1, . . . ,4 and where a is the grating pitch, with for example m=−1. As regards their positions (lateral positions), the axes X1, X2, X3 and X4 are chosen so as to meet the grating 30 at the same point O (beam combination point). In other words, on grating 30, beams F1 to F4 are superimposed with each other (they occupy the same position, in the plane of the grating).

The diffraction grating 30 is a blazed grating: the grating pattern, periodically repeated with pitch a, is a facet 31 tilted, with respect to the plane P of the grating, by an angle called the blaze angle $\gamma$. The blaze angle $\gamma$ is chosen so as to maximize the light power diffracted in the m-order (that is the grating is blazed in the m-order), for a wavelength known as the blaze wavelength $\lambda b$. For this, the blaze angle $\gamma$ is chosen to be equal to ($\theta o$+$\theta d$)/2 where $\theta d$ is the diffraction angle for the m-order and for the wavelength $\lambda b$: sin $\theta_d$+sin $\theta o$=−m.$\lambda_b$/a.

Employing such a blazed grating makes it possible to limit power losses when combining the different beams F1 to F4 on the grating. Indeed, with such a grating, the diffraction efficiency towards the m-order, around the blaze wavelength $\lambda$, can commonly be greater than 70%, or even greater than 90%. This means that, conversely, the combination efficiency can be higher than 70% or even 90%.

The blaze wavelength $\lambda_b$ (and the corresponding blaze angle, $\gamma$) can, for example, be chosen between the smallest and the largest of the emission wavelengths $\lambda 1$ to $\lambda 4$, to obtain good combination efficiency for each of these wavelengths. By way of example, k may be equal to the mean of these emission wavelengths $\lambda 1$ to $\lambda 4$. It should be noted, however, that the laser sources used here emit linearly polarized beams, all along the same axis. In this case, it is possible to obtain very high diffraction (and therefore combination) efficiencies (for example greater than 85 or even 90%), even if the blaze wavelength $\lambda_b$ is slightly offset from the wavelength range [$\lambda 1$, $\lambda 4$].

The blaze angle $\gamma$ may, for example, be more precisely chosen so as to maximize light power that is diffracted in the m-order, at the blaze wavelength $\lambda_b$, and, further, for the particular geometrical configuration referred to as the Littrow configuration, for which $\theta o$=$\theta_d$=$\gamma$=−arcsin(m. $\lambda_b$/(2a)).

In the different embodiments described here, the different light beams propagate and are contained in a same plane of propagation, herein the plane (x,y), which corresponds to the plane of the figure in FIGS. 1, 2 and 7 to 9. Just at the exit of the laser sources, the light beams each propagate in this plane. The first mirrors, the plane of the grating and, where present, the second mirrors, are each perpendicular to this plane of propagation, so that the beams remain contained in the plane in question during their propagation in the device (all the more so as the lines of the grating are perpendicular to this plane).

As already indicated, in the first embodiment, the device 1 comprises one, and not two, sets of mirrors arranged in the path of the light beams F1, F2, F3, F4, between the sources 11, 12, 13, 14 and the dispersive element 30 (see FIG. 1).

Here, the light beams F1, F2, F3, F4 are collimated over the entire path they follow, from the source emitting the beam in question, to an object plane. Each of these beams thus forms a beam of rays substantially parallel to each other, with little or no divergence, over the entire path followed by this beam. Herein, each source 11, 12, 13, 14 comprises an individual collimation element, for example a convergent aspherical lens or a set of globally convergent lenses, which enables the light beam it emits to be collimated. In some embodiments, a single cylindrical lens common to the different beams may be placed on the paths of these beams, at the exit of the sources, to reduce an (individual) divergence exhibited by each of these beams in a vertical plane, stronger than the divergence of this beam in the horizontal plane x,y.

Immediately at the exit of the sources, the respective axes of propagation, on which the different light beams F1, F2, F3, F4 are centered, are parallel to one another. Herein, they are each parallel to the axis x visible in FIG. 1. As for the sources 11, 12, 13, 14, they are disposed one after the other, in line, along an axis γ perpendicular to the axis x.

The set of mirrors 120 comprises, for each source 11 to 14, a mirror 121 associated with this source, which reflects the beam F1, F2, F3, F4 emitted by this source towards the dispersive element 30. This mirror 121 is positioned and oriented so that, after reflection on this mirror, the beam considered, F1, F2, F3 or F4, is centered on the pre-combination axis of propagation X1, X2, X3 or X4 mentioned above. The first mirrors 121 are flat.

The set of mirrors 120, which comprises four mirrors 121, is here monolithically made. It comprises a monolithic part 105, that is a single piece (monobloc, with continuity of material from one portion of the part to the other). This part comprises at least as many facets as there are mirrors 121, in this case at least four facets. The mirrors 121 are made here by polishing the facets and then depositing a reflective coating onto these facets. This reflective coating is, for example, a metal deposit that reflects in the mid-infrared, such as a gold, silver or aluminum deposit (possibly itself covered with a thin transparent protective layer). In FIG. 1, the reference sign 121 identifies both the mirror considered and the corresponding facet of the monolithic part 105.

The monolithic part 105 is formed, for example, by a metallic material or a crystalline semiconductor material such as silicon. The facets in question may be obtained by etching, by molding, or by machining by material removal (for example by milling).

In the example represented, reflection on the mirrors 121 takes place externally, with respect to the monolithic part 105 (in other words, the light beams do not pass through this part).

Alternatively, the monolithic part could be at least partially transparent to the light beams F1 to F4, and such that these light beams pass therethrough (the part absorbing, for example, less than 10% of the light power of these beams). By way of example, the monolithic part can be made from a chalcogenide glass, such as Zinc Selenide ZnSe or Germanium Selenide GeSe. In this case, the reflection on the mirrors would occur on the inner side of the part, and not on the outer side. This reflection can be achieved by a reflective deposit made on the facets in question, or by total internal reflection on these facets.

Still alternatively, the mirrors in question can be made in the form of individual mirrors (in the form of individual optical components) each including a reflective coating (for example metallic) deposited on an individual substrate, this substrate itself being permanently attached, for example bonded, against one of said facets of the monolithic part. In this case, the reflection on the mirrors takes place on the outer side of the substrates in question, on a front face of the component, the rear face being attached against one of said facets.

Regardless of how the single-piece part 105 is made, the mirrors 121 are sufficiently large to each intercept most of the light beam F1-F4 reflected from the mirror considered. The coverage rate between the irradiance profile (power profile per unit area) of the beam considered, and the mirror 121 on which it is reflected is greater than 80%, or even greater than 90%. By way of example, for an angle of incidence a of the beam F1-F4, on the mirror 121 which reflects it, the extension c of the mirror 121 in the plane (x,y) (width of the mirror 121, in the plane x,y, or diameter of the mirror 121) is greater than or equal to ø/cos(a), where the diameter ø of the beam is the total width of the irradiance profile, taken at $1/e^2$ from the maximum of this profile.

This first embodiment is simpler to implement than the embodiments described below, since it does not comprise a second set of deflection mirrors. On the other hand, as already explained in the section entitled "Summary", it provides less flexibility in positioning the beams and sources, and generally results in a less compact device than the other embodiments, with two sets of mirrors.

Figure 2:
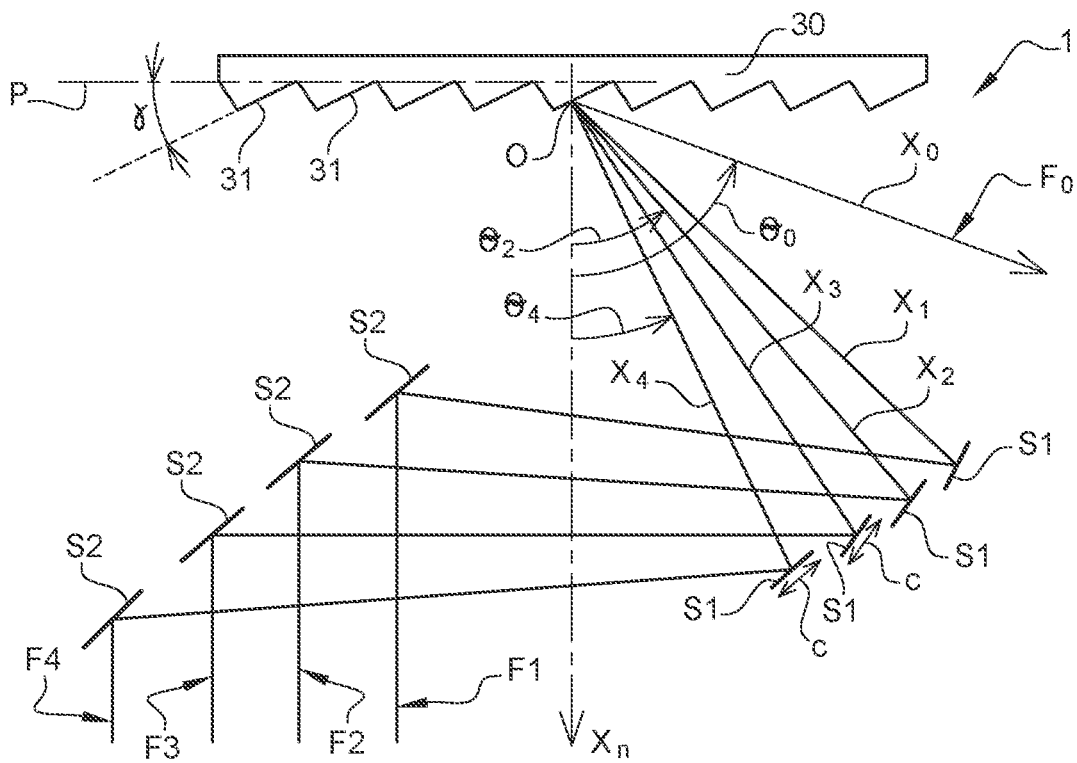
FIG. 2 schematically represents an optical configuration common to a second, third, fourth and fifth embodiment implementing the teachings of the invention.

FIG. 2 represents an optical configuration of the device 2; 3; 4; 5, common to the second, third, fourth and fifth embodiments. As already indicated, in these embodiments, the device 2; 3; 4; 5 comprises the first set of mirrors 220; 520 as well as a second set of mirrors 223; 423; 523.

The first set of mirrors comprises, for each source 11, 12, 13, 14, a first mirror 221; 521 which reflects the light beam F1, F2, F3, F4 emitted by this source towards the dispersive element 30, with a direction and position adapted so that the different beams F1-F4 are superimposed with one another, after deflection by the dispersive element 30.

The second set of mirrors 223; 423; 523 comprises, for each source 11, 12, 13, 14, a second mirror 222; 422; 522 which reflects the light beam F1, F2. F3. F4 emitted by this source towards the first mirror 221; 521 associated with this source. The second set of mirrors 223; 423; 523 thus makes it possible to adapt the positions, and possibly directions that the light beams have at the exit of the sources, to the positions and orientations of the first mirrors 221; 521.

In FIG. 2, the reflective surfaces S1 of the first mirrors 221; 521 and the reflective surfaces S2 of the second mirrors 222; 422; 522 have been represented generically, irrespective of the way in which these mirrors are made.

For the second, third, fourth and fifth embodiments, the emission wavelengths λ1 to λ4 are classified in the following order: λ1>λ2>λ3>λ4. As already indicated, they are located in the mid-infrared, between 2 and 15 microns. The two wavelengths λ1 and λ2 form a close wavelength pair, and the same is true of the two wavelengths λ3 and λ4: the wavelength difference λ1-λ2 is less than 0.5 micron, and the same is true of the difference λ3-λ4, which is even less than 0.3 micron (and, in fact, less than 0.2 micron) here. As for the total deviation between wavelengths, λ1-λ4, it is greater than 0.5 micron, and even greater than 1.5 micron, or even greater than 2 microns, here. For these examples, the first pair of wavelengths λ1, λ2 is centered on a mean wavelength of about 8 microns while the second pair of wavelengths λ3, λ4 is centered on a mean wavelength of about 6 microns.

As already explained in the section entitled "summary", a distribution of wavelengths in pairs of close wavelengths, such as this one, is very interesting in terms of detection, imaging or concentration measurement of various molecules, as it allows detection or differential measurement. On the other hand, it leads to angles of incidence on the dispersive element 30, θ1et θ2 which are close to each other, and the same applies to the angles of incidence θ3 and θ4.

By way of example, for a grating comprising 150 lines per mm (that is a pitch a of 6.67 microns), which is well adapted for recombining wavelengths which, as here, occupy a fairly large mid-infrared range, the angular difference θ1-θ2 is in the order of or less than 5 degrees, while the angular difference θ3-θ4 is in the order of or less than 2 degrees.

Beams F1 and F2 are therefore not very far apart angularly, and the same applies to beams F3 and F4. As the device 2; 3; 4; 5 is compact (the distance between the grating and the first mirrors is typically about ten cm, or even less), given the small angular deviation between beams F3 and F4, the first mirrors 221; 521 which reflect these two beams are positioned in proximity to each other, from a lateral point of view. These mirrors, as well as the first mirrors reflecting beams F1 and F2, each have a small lateral dimension c, for example just sufficient to intercept the light beam reflected on the mirror considered.

By way of example, the extension c of each of the former, in the plane (x,y) (width of the mirror in the plane (x,y), or diameter of this mirror) may be between 0.8 times and 3 times the diameter ø of the beam considered (ø being the total width of the irradiance profile of the beam, taken at $1/e^2$ from the maximum of this profile). More precisely, this extension c can be set between 0.8 and 2 times the amount ø/cos(a), where a is the angle of incidence of the beam on the mirror considered.

In any case, given the proximity of the first two mirrors that reflect the beams F3 and F4 (and the proximity of the first two mirrors that reflect the beams F1 and F2), it is easy to understand the advantage of having the second set of mirrors 223; 423; 523, which enables these beams to be brought closer to one another in order to adapt their positions to the restricted positions of the first mirrors 221; 521.

The second, third, fourth and fifth embodiments are now set forth more specifically, one after the other.

The device 2 according to the second embodiment is schematically represented, in a perspective view, in FIGS. 3 to 6. For the sake of clarity, in FIG. 3 only the light beam F4 emitted by the fourth source 14 of device 2 is represented. Similarly, in FIGS. 4, 5 and 6, only the beam F3, the beam F2 and the beam F1 are represented respectively.

In this second embodiment, the entire device 2 is made from a single monolithic part 205, which serves as a common support for the different elements of the device.

The first mirrors 221 and the second mirrors 222 are produced in the form of different planar facets of this same monolithic part 205. These facets are reflective either because the material forming the monolithic part 205 is itself reflective and suitably polished (or etched), or because they are covered with a reflective deposit, for example a metal deposit. The mirrors and facets in question are identified by the same references, 221 and 222, in FIG. 3.

The dispersive element 30, which is a reflection diffraction grating, is permanently attached, for example bonded against a face 206 of the monolithic part 205. Herein, it is a lateral face of the grating, perpendicular to the plane P of the grating, which is bonded against the face 206 of the monolithic part, which face 206 is itself parallel to the plane (x,y) mentioned above (mean plane in which the different light beams propagate). Alternatively, a rear face of the grating (face parallel to the plane of the grating) could be attached against a face of the monolithic part perpendicular to the plane (x,y).

The four laser sources 11, 12, 13 and 14 are also permanently attached to the monolithic part 205. Herein, each of these sources comprises an individual casing which integrates the different components of the source and which comprises a lower, planar shoe 17 which is attached against a face of the monolithic part 205 (herein a face parallel to the plane xy).

The monolithic part 205 is made of a thermally conductive material, that is having a thermal conductivity greater than or equal to 100 Watts per meter per Kelvin, or even greater than 200 Watts per meter per Kelvin. The monolithic part 205 acts as a thermal radiator to dissipate heat released by the laser sources, this radiator having, for example, for the heat transfer in question, a thermal resistance of less than 0.2 Kelvin per Watt. Here, it is made of metal, for example aluminum or an aluminum alloy. As the laser sources 11-14 are mounted with their shoe 17 in contact with this part 205, good thermal contact is obtained between these sources and the conductive monolithic part 205, which promotes dissipation of heat generated by these sources and may help to improve stability of their operating temperature, and therefore stability of the mean emission wavelength of each of the sources (which, among other things, improves stability of the direction of the beam considered after the dispersive element).

In this second embodiment, each light beam F1-F4 has a diameter ø of 3 mm. At the exit of the sources 11, 12, 13, 14, each of these beams F1, F2, F3, F4 propagates parallel to the axis γ. The sources 11, 12, 13, 14 are disposed side by side along a line parallel to the axis x.

Each second mirror 222 is located opposite the exit aperture of the corresponding source, and is tilted by 45 degrees to the beam F1, F2, F3, F4 that it reflects. It therefore deflects this beam by approximately 90 degrees. After reflection from these mirrors, the beams F1-F4 are therefore parallel to the axis x.

The first two mirrors 221, which reflect the beam F3 and the F4 beam respectively, are adjoining each other here (on the side, they are in contact with each other). The same applies to the first two mirrors 221 which reflect the beam F1 and the beam F2 respectively. The angles of incidence on the first mirrors 221 are slightly less than 45 degrees. These angles of incidence are chosen so that the beams F1-F4 then light the grating 30 with the angles of incidence θ1-θ4 mentioned above, adapted to combine these beams by diffraction. The first and second mirrors 221, 222 each have a rectangular reflecting surface, the width of which is for example between 3.5 and 4.5 mm.

The grating 30 is, for example, a grating optimized for a blaze wavelength $λ_b$ of 10.6 microns, blazed in −1 order (this type of grating, which is relatively standard, is commercially available and can be easily acquired). Its blaze angle γ is between 30 and 40 degrees. Here, this grating and its orientation are such that the exit angle θo is approximately 40 degrees.

In this configuration, a combining efficiency of 70% is obtained for the beam F4, whereas it is 95% for the beam F1 (whose mean wavelength λ1 is close to the blaze wavelength $λ_b$). By combination efficiency, it is meant the ratio between:

the power of the light beam considered, after deflection by the dispersive element, once superimposed with the other beams, and the power of this same beam just upstream of the dispersive element, before combination.

Alternatively, another type of diffraction grating could be used. As mentioned above, this could, for example, be a blazed diffraction grating, the blaze angle γ of which is chosen to obtain optimum diffraction efficiency in the −1 order, in the Littrow configuration, at a blaze wavelength $\lambda_b$ of between λ4 and λ1 (rather than being greater than λ1).

Still alternatively, instead of being produced directly by metal deposition onto facets of the monolithic part 205, the first and second mirrors could be produced in the form of individual mirrors (individual optical components) each including a reflective coating (for example metallic) deposited onto an individual substrate, this substrate being permanently attached, for example bonded, against a facet of the monolithic part in question. The reflective surfaces of these individual mirrors (which correspond to a front face of the optical component) are then positioned in the same place as the reflective facets 221, 222 described above, visible in FIG. 3.

Furthermore, instead of being completely monolithic, the part 205 could be made in the form of several distinct blocks attached to one another, for example:
 a first block for the first set of mirrors,
 a second block for the second set of mirrors, and
 a third block serving as a support, to which the first and second blocks as well as the laser sources and the grating would be attached.

In this case, the first block would have at least as many facets as there are first mirrors, and the first mirrors would be made by etching or polishing one of said facets, or by etching or polishing followed by a reflective deposit on one of said facets, or would be permanently attached against one of said facets. The second set of mirrors would be made in the same way, on the basis of the second block.

Figure 7:
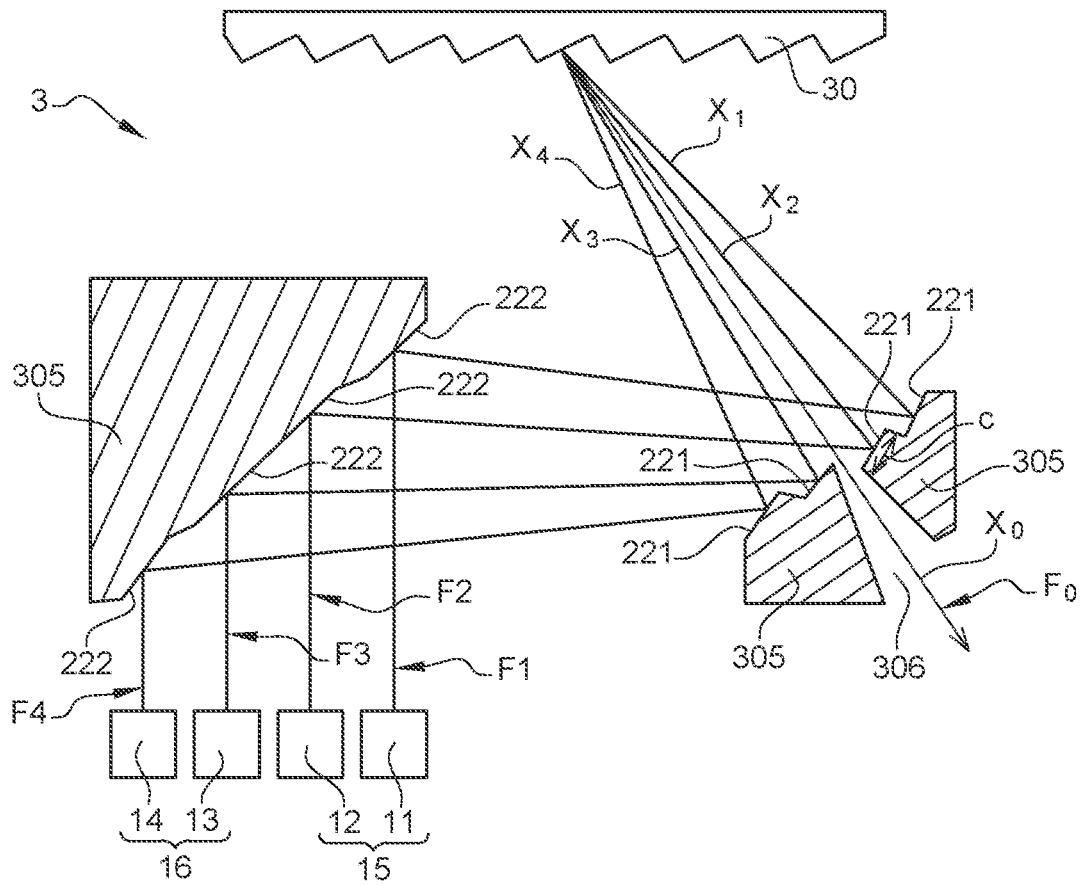
FIG. 7 schematically represents the device for producing a polychromatic light beam according to the third embodiment, in a top view.

The third embodiment of the device 3 is schematically represented in FIG. 7. It is similar to the second embodiment but, in this third embodiment, the polychromatic light beam Fo exits the device 3 by passing through a passageway 306 provided between two of the first mirrors 221.

Herein, this passageway 306 is located between
 the pair of first mirrors 221 (close to each other) on which the beams F3 and F4 are reflected, and
 the pair of first mirrors 221 (close to each other) on which the beams F1 and F2 are reflected.

The passageway 306 can be obtained, as here, by etching or machining the monolithic part 305 on which the first mirrors 221 are made or attached. This aperture, through which the polychromatic light beam Fo passes, is thus obtained while maintaining the monolithic (one-piece) nature of part 305.

Figure 3:
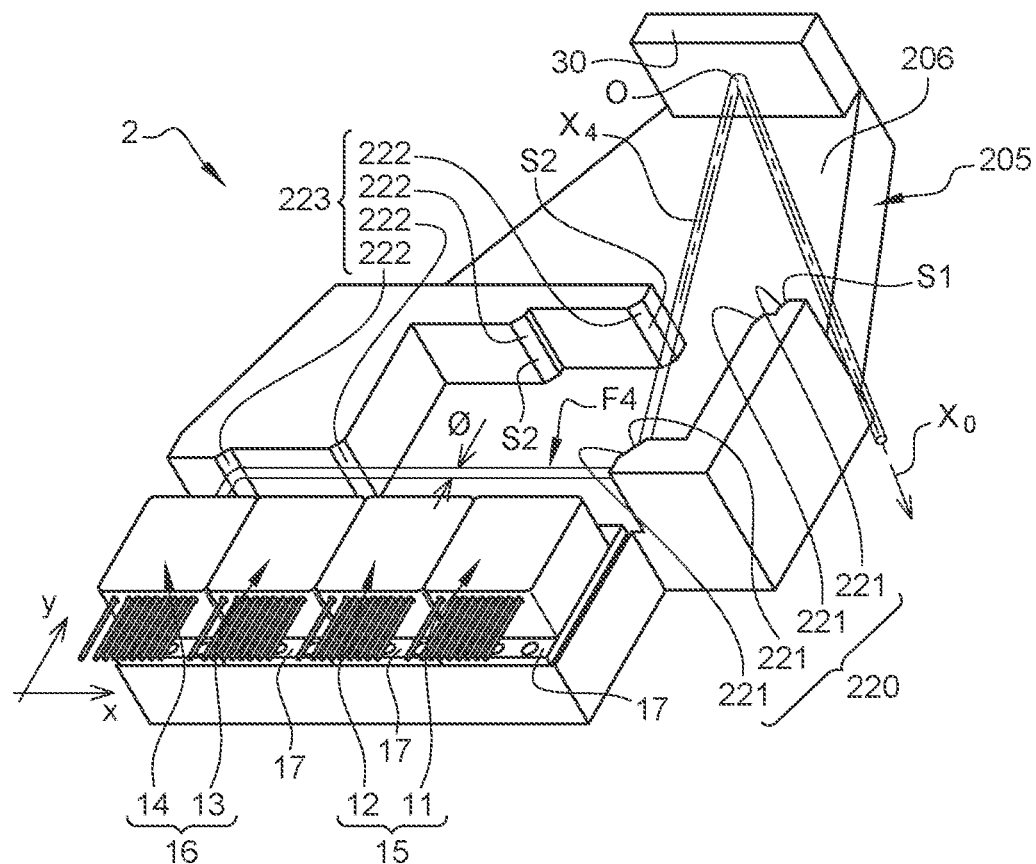
FIG. 3 is a schematic perspective representation of the second embodiment of the device for producing such a polychromatic light beam, in which only one of the individual light beams that are combined to obtain the polychromatic light beam has been represented.
Figure 4:
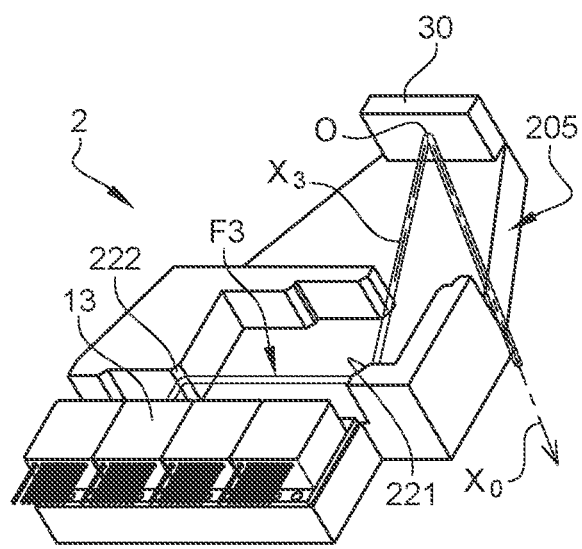
FIG. 4 again represents the device of FIG. 3, but showing another of said individual light beams.
Figure 5:
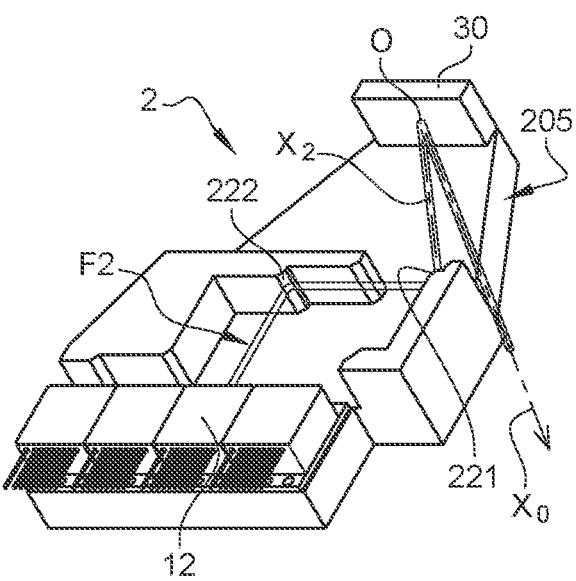
FIG. 5 again represents the device of FIG. 3, but showing yet another of said individual light beams.
Figure 6:
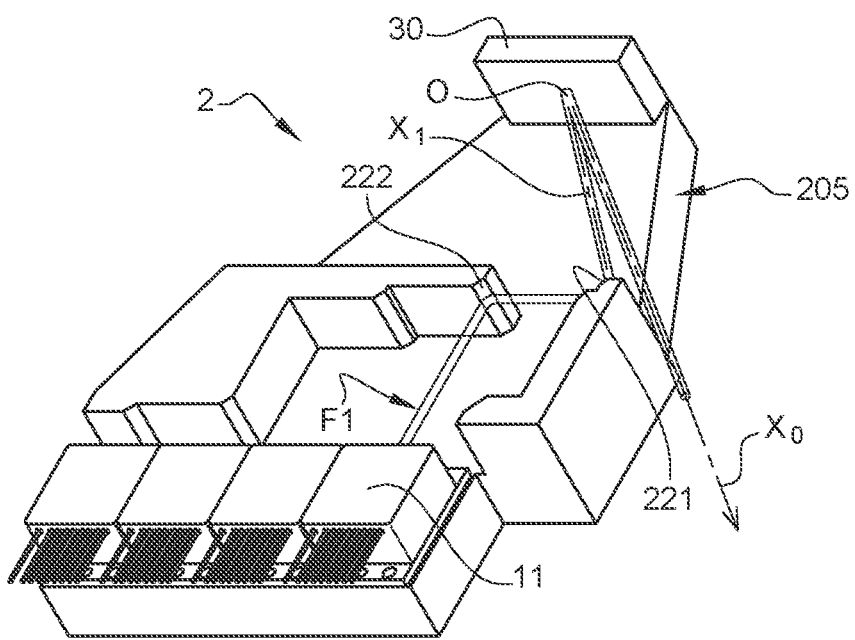
FIG. 6 again represents the device of FIG. 3, but showing the last of the individual light beams in question.

It will be noticed that the device 3 can be obtained by slightly modifying the device 2 of the second embodiment visible in FIG. 3, as follows: the characteristics and/or orientation of the diffraction grating 30 are modified so as to modify orientation of the common axis Xo, and the passageway in question is opened, in the monolithic part (by machining), between the two pairs of first mirrors mentioned above. In this case, the first and second mirrors are thus directly made on the monolithic part 305, which also serves as a support for the laser sources and the grating.

Alternatively, however, the passageway in question could be obtained by making the first set of mirrors from two distinct monolithic parts, integral with each other and spaced apart so that the Fo beam can pass between them. In this case, two of the first mirrors 221 are made (or attached) on one of these two monolithic parts, while the other two first mirrors 221 are made (or attached) on the other monolithic part. It will be noticed that, even if two distinct parts are utilized, several first mirrors are nevertheless made on a same monolithic part, in this case.

In any case, the configuration adopted in the third embodiment, with the overall beam Fo passing between the light beams F1-F4 incident on the grating 30, in the opposite direction to them, is interesting in terms of combination efficiency. Indeed, this geometrical configuration corresponds to a configuration close to the Littrow configuration mentioned above, and, in general, it is in this configuration that the highest diffraction efficiencies are achieved.

Figure 8:
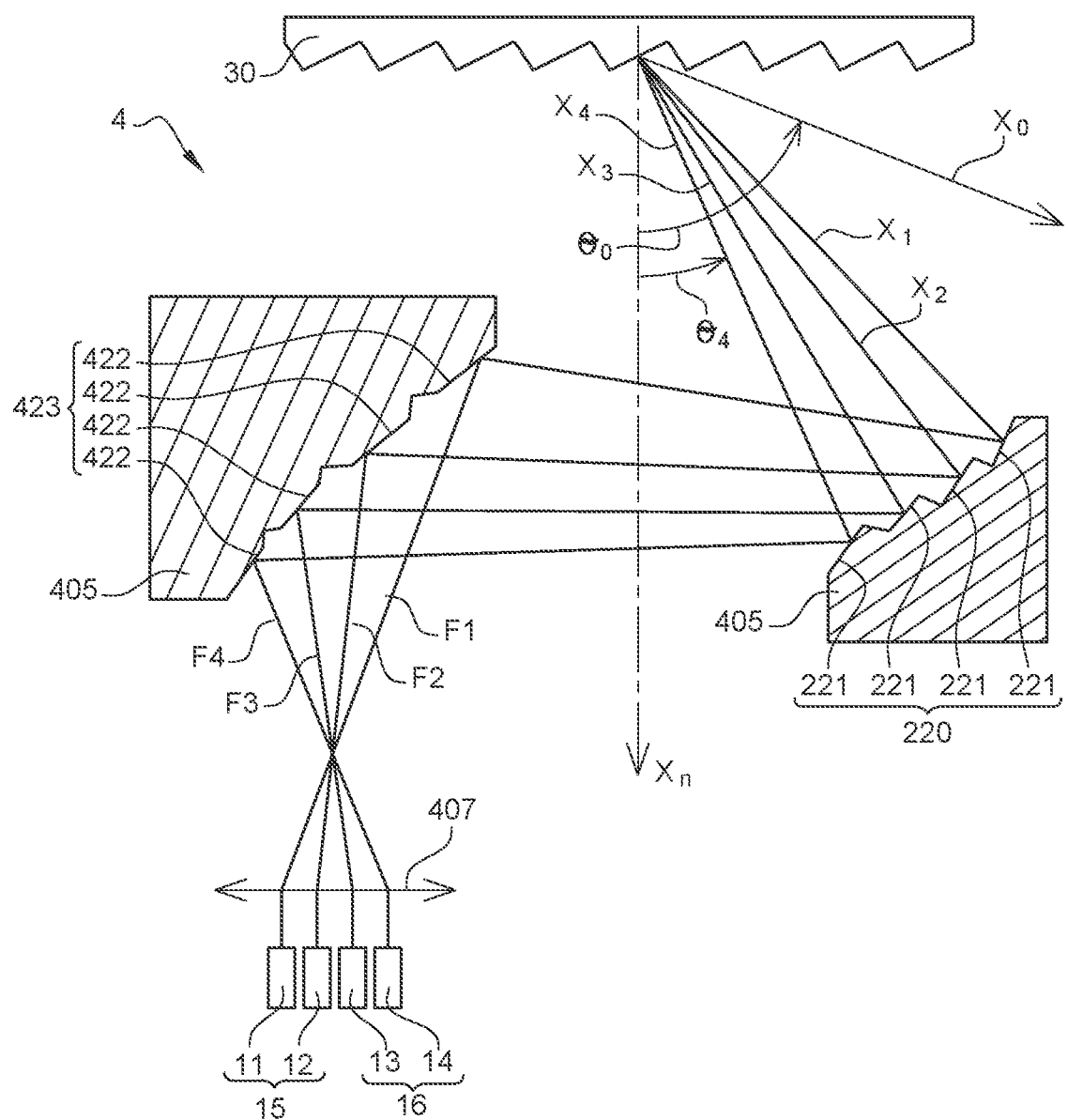
FIG. 8 schematically represents the device for producing a polychromatic light beam according to the fourth embodiment, in a top view.

The fourth embodiment of the device 4 is schematically represented in FIG. 8. It is similar to the second embodiment but, in this fourth embodiment, the light beams F1-F4 leaving the laser sources 11-14 are not collimated. Just at the exit of the sources, these beams are strongly divergent. The device 4 therefore comprises a collimation element 407 common to the different light beams F1-F4 arranged in the path of these beams, just at the exit of the sources 11-14. This same collimation element 407 modifies divergence of each of the light beams, herein in such a way as to considerably reduce this divergence to give the light beam the form of a beam of parallel rays.

The collimation element 407 is overall convergent (positive image focal length). It can be made in the form of a convergent lens (for example an aspherical lens), or in the form of a globally convergent group of lenses. As an alternative, the collimation element could possibly comprise a converging mirror, on which the different light beams to be collimated would be reflected.

The respective directions of propagation of the different light beams F1-F4 are modified, quite significantly, by the collimation element 407. In other words, this element not only collimates the light beams, but also modifies the mean directions of propagation of these beams.

The second set of mirrors, 423, makes it possible to correct this large angular deviation between the beams F1-F4, and makes it possible to bring these beams closer to one another, in pairs, so that they reach the first mirrors 221 (which are themselves grouped in pairs of two mirrors close to one another).

In this fourth embodiment, the positions and orientations of the first mirrors 221 may be similar, or even identical, to those mentioned when setting forth the second embodiment. On the other hand, the positions of the second mirrors 422, mainly imposed by the angular deviation between beams caused by the collimation element 407, are markedly different from those of the second mirrors 222 of the second embodiment.

The device 4 comprises a monolithic part 405, comparable to the monolithic part 205 of the second embodiment: the first and second mirrors 221, 422 are made (or attached) on facets of this one-piece part 405, which also serves as a support for the sources 11-14, the grating 30, and the collimation element 407.

Alternatively, however, the first and second sets of mirrors, 220 and 423, could be made respectively from two distinct monolithic parts.

Still alternatively, the common collimation element could be omitted, the second mirrors then being converging mirrors, each correcting divergence specific to the light beam reflected on that mirror.

Figure 9:
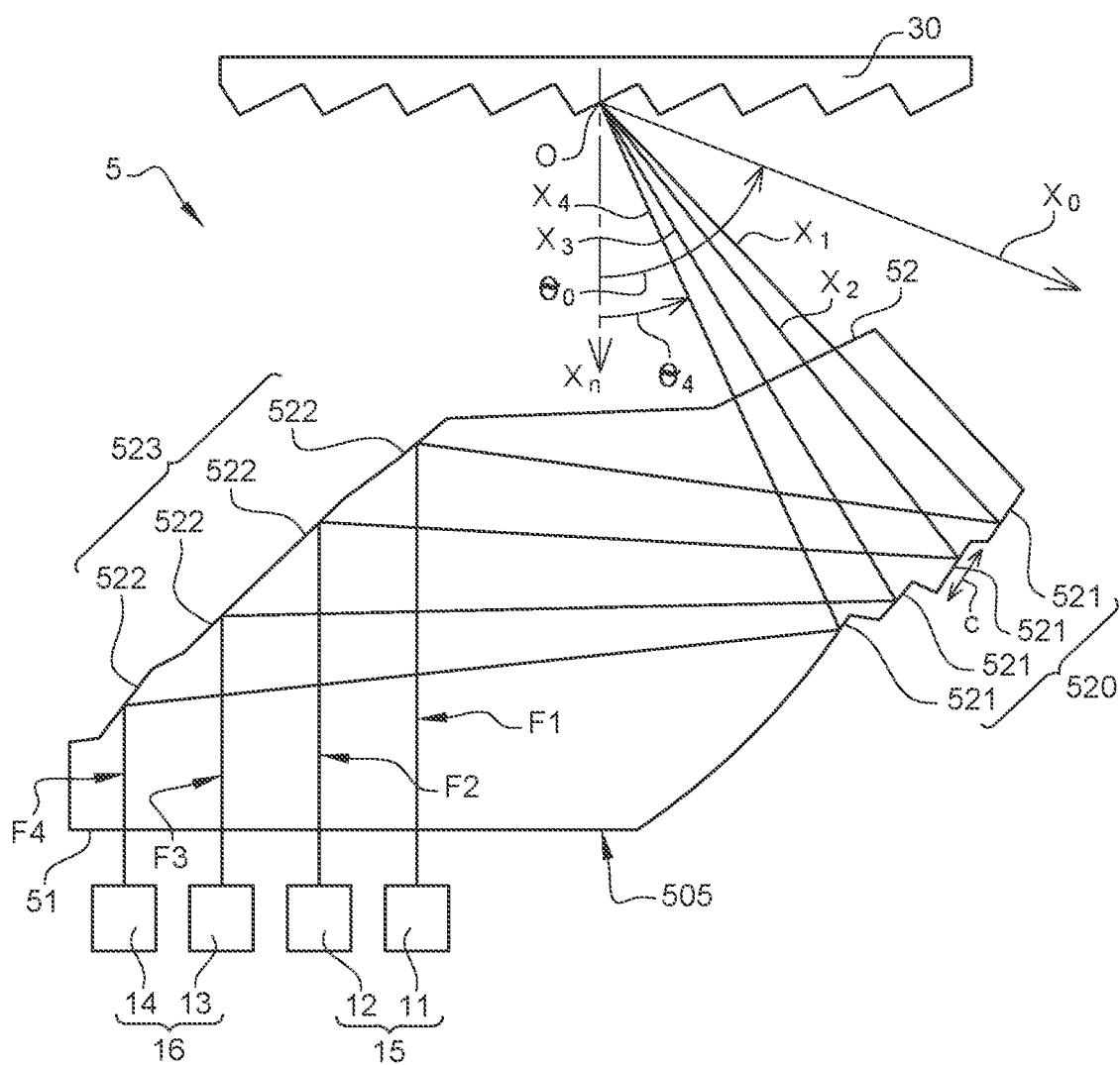
FIG. 9 schematically represents the device for producing a polychromatic light beam according to the fifth embodiment, in a top view.

In the fifth embodiment, the monolithic part 505, which serves as a support for the first mirrors 521, is made of a material that is essentially transparent to the light beams F1-F4 (FIG. 9). This monolithic part additionally serves as a support for the second mirrors 522. Part 505 absorbs, for example, less than 10% of the light power of the beams F1-F4 passing through it. It is made of chalcogenide glass, such as Zinc Selenium ZnSe or germanium.

Each first mirror 521 and each second mirror 522 corresponds to a planar facet of this part 505. Here, each of these facets is covered with a reflective coating, herein metallic. Reflection on these different mirrors takes place on the inner side of the part, in the material in question.

Alternatively, this reflective coating could be omitted, the reflection in question being obtained by total internal reflection on the facets. In this case, tilt of the beams with respect to the facets serving as mirrors should of course be compatible with total internal reflection in the material in question.

The light beams F1-F4 emitted by the laser sources 11-14 enter the part 505 via a planar input face 51, which is here covered by an anti-reflection treatment. After reflection on the second 522 and then on the first mirrors 521, these beams exit the part 505 via a planar exit face 52, which is also covered by an anti-reflection treatment.

Alternatively, the diffraction grating could be made, by etching or deposition, directly onto a face of the monolithic part in question, the grating then being either a transmission grating or a reflection grating.

In addition, instead of delivering collimated light beams, the sources could deliver divergent light beams, as in the fourth embodiment. In this case, the device can be provided with a collimation element common to the different light beams. This collimation element can be produced in the form of a convex entrance face of the monolithic part.

Making the combining system essentially from this transparent monolithic part, in which the light beams propagate, makes it possible to dispense with any absorption caused by water vapor or carbon dioxide of the air which would otherwise be present in their path, and which, in the mid-infrared, can have marked absorption peaks (absorption which is further likely to vary over time, due to variations in the water vapor or $CO_2$ content). This makes it possible to avoid placing the device in a hermetically sealed enclosure filled with nitrogen, for example.

The device 1; 2; 3; 4; 5 just described makes it possible to produce a polychromatic light beam Fo making it possible especially to read out multi-spectral images in the mid-infrared, which is useful especially in the field of medical imaging, defense and the agri-food industry.

It will be noted that different alternatives can be made to this device, in addition to those already mentioned.

For example, another type of dispersive element, such as a prism, could be used instead of the aforementioned grating. Furthermore, this grating could be of another type. For example, it could be a transmission grating instead of a reflection grating. And instead of being employed in the −1-order, it could be used in another diffraction order, for example in the −2 order.

Furthermore, some of the pre-combination axes of propagation could correspond to a given diffraction order m, while the other pre-combination axes of propagation would correspond to another diffraction m'-order. Thus, axes X1 and X2 could correspond to −1-order, while axes X3 and X4 would correspond to +1, or −2 order. Making use of different diffraction orders in this way can make it easier to combine beams that have close wavelengths in pairs, while being distributed over a fairly wide range of wavelengths. For example, −1 order can be used to combine two wavelengths that are close to each other, and −2 order to combine two other wavelengths that are close to each other but far from the other two. In terms of combination efficiency, such an arrangement is nevertheless less favorable than a combination carried out in the same diffraction order, for which the grating is optimized.

The grating could also be configured and positioned so as to couple each individual light beam to a propagation mode parallel to the plane of the grating, the different light beams incident on the grating then being combined in the form of a single polychromatic light wave propagating in parallel to the grating.

On the other hand, laser sources used could be of a type other than those mentioned above (in this case QCLs). For example, they could be ICL (Interband Cascade Laser) sources, other types of laser diodes (with or without mounting as an external cavity), other types of external or internal cavity lasers, or even tunable lasers.

The invention claimed is:

1. A device for producing a polychromatic light beam by combining a plurality of individual light beams, the device comprising:
    several distinct laser sources each emitting adapted to emit an individual light beam, said laser sources having respective mean emission wavelengths that are different from one another, and
    a beam combining system comprising:
    a dispersive element that deflects is adapted to deflect each of said beams differently, as a function of the mean emission wavelength corresponding to that beam, and
    a set of deflecting mirrors which, for each laser source, comprises a deflecting mirror associated with said laser source, the deflecting mirror; 221; adapted to reflect the light beam emitted by said laser source towards the dispersive element, the deflecting mirror being positioned and oriented so that, after deflection by the dispersive element, said light beam is substantially centered on a common axis of propagation, which is the same for the different light beams,
    the device comprising a monolithic part which has at least as many facets as there are laser sources and in which, for each of said deflecting mirrors, the reflecting surface of the deflecting mirror is formed by one of said facets, or by a reflective deposit covering said facet, or by a front face of an individual optical component a rear face of which is attached against said facet,
    each mean emission wavelength being between 2 microns and 15 microns,
    at least two of said mean emission wavelengths being separated from each other by less than 0.3 micron, and
    at least two of said mean emission wavelengths being separated from each other by more than 0.5 micron.

2. The device according to claim 1, comprising several pairs of sources each gathering two of said laser sources and wherein, for each pair of sources, the two mean emission wavelengths of the two laser sources of the pair considered are separated from one another by less than 0.3 micron.

3. The device according to claim 2, wherein the two mean emission wavelengths of the two laser sources of the pair considered are separated from one another by less than 0.15 micron.

4. The device according to claim 1, wherein the combining system further comprises a set of additional mirrors which, for each laser source, comprises an additional mirror associated with the laser source, this the additional mirror adapted to reflect the light beam emitted by the laser source towards the deflecting mirror associated with the laser source considered.

5. The device according to claim 4, wherein said monolithic part further has additional facets and wherein, for each additional mirror, the reflective surface of the additional mirror is formed by one of said additional facets, or by a reflective deposit covering said additional facet, or by a front face of an individual optical component the rear face of which is attached against said additional facet.

6. The device according to claim 4, comprising an additional monolithic part which has at least as many facets as there are additional mirrors, and wherein, for each additional mirror, the reflecting surface of the additional mirror is formed by one of the facets of the additional monolithic part, or by a reflective deposit covering said facet, or by a front face of an individual optical component the rear face of which is attached against said facet.

7. The device according to claim 1, wherein:
immediately upstream of said dispersive element, the individual light beams are respectively centered on different pre-combination axes of propagation, and at least two of said pre-combination axes of propagation are angularly separated from each other by less than 5 degrees, or even less than 2 degrees, and wherein
the two deflecting mirrors, which reflect the two light beams whose pre-combination axes of propagation are angularly separated from one another by less than 5 degrees, each have a transverse dimension of between 0.8 times and 3 times a diameter of the beam considered, the diameter of the beam being a total width of an irradiance profile of the beam, taken at $1/e^2$ from a maximum of the profile.

8. The device according to claim 1, wherein said dispersive element is a diffraction grating made on a face of said monolithic part, or permanently attached against a face of the monolithic part.

9. The device according to claim 1, wherein said monolithic part is made of a thermally conductive material with a thermal conductivity greater than or equal to 100 Watts per meter per Kelvin, and wherein the laser sources are in thermal contact with said monolithic part.

10. The device according to claim 1, wherein said dispersive element is a reflection diffraction grating, the device comprising a passageway provided between two of said deflecting mirrors, said common axis of propagation passing through said passageway.

11. The device according to claim 1, wherein said monolithic part is made of a material essentially transparent to said light beams.

12. The device according to claim 1, comprising a collimation element common to the different individual light beams, said same collimation element modifying a divergence specific to each of said light beams.

13. The device according to claim 12, comprising a collimation element common to the different individual light beams, said same collimation element modifying a divergence specific to each of said light beams, wherein said collimation element comprises an entrance face of said monolithic part essentially transparent to said light beams, said entrance face being convex.

14. The device according to claim 1, wherein the at least two of said mean emission wavelengths are separated from each other by less than 0.15 micron.

15. The device according to claim 1, wherein at least two of said mean emission wavelengths being separated from each other by more than 1.5 micron.

* * * * *